July 8, 1941.   A. KRAJNC   2,248,273
BIRD CAGE AND SMOKING STAND
Filed March 16, 1940   2 Sheets-Sheet 1

Anthony Krajnc
Inventor

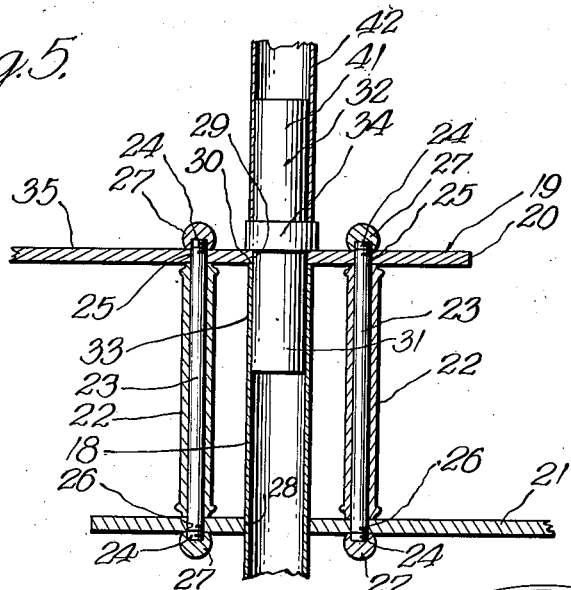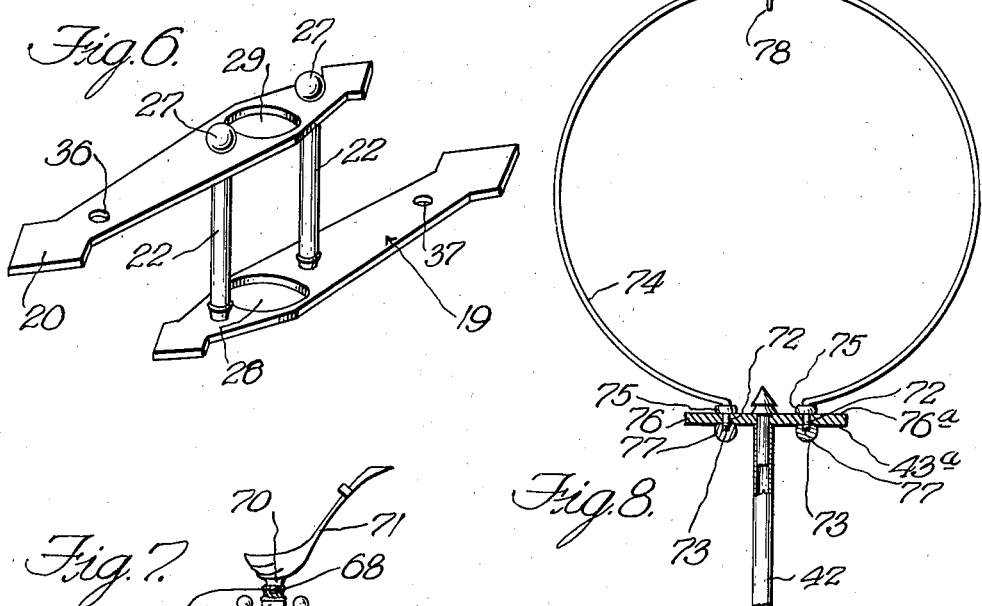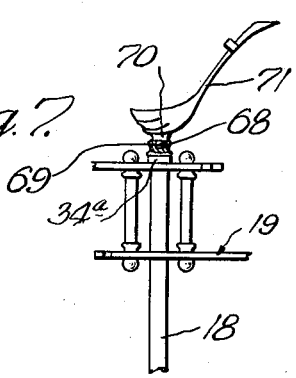

Patented July 8, 1941

2,248,273

UNITED STATES PATENT OFFICE 2,248,273

BIRD CAGE AND SMOKING STAND

Anthony Krajnc, Superior, Wis.

Application March 16, 1940, Serial No. 324,337

2 Claims. (Cl. 248—154)

This invention relates to new and useful improvements in a combination bird cage, smoking stand and the like, and more particular to a support therefor; which is an improvement on my Patent #1,933,673 filed May 3, 1932.

One of the objects of the invention is to provide a support construction on which a rotatable frame may be mounted.

Another object is to provide a support construction which may be easily assembled and dismantled to facilitate packing in a minimum amount of space.

With these and other objects in view the invention will be better understood by referring to the following specification and accompanying drawings wherein like numerals represent corresponding parts and Fig. 1 is a side elevational view of a device constructed in accordance with my invention.

Fig. 5 is an enlarged fragmentary longitudinal section of the lower frame.

Fig. 6 is a perspective view of the lower frame.

Fig. 7 is a modified form depicting the lower section of the device, and

Fig. 8 is a modified form depicting the upper section.

Figure 1:
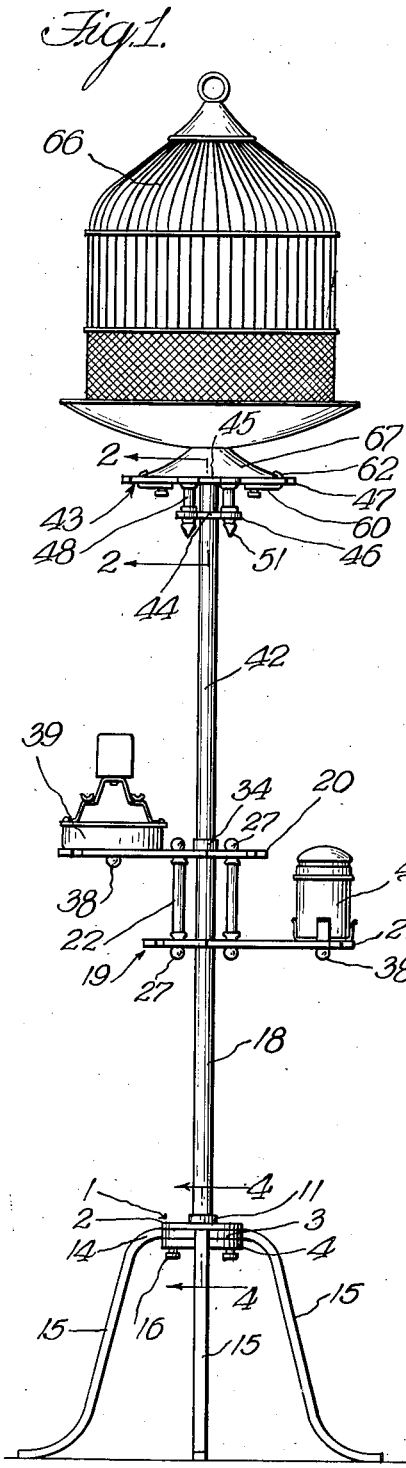
Figure 2:
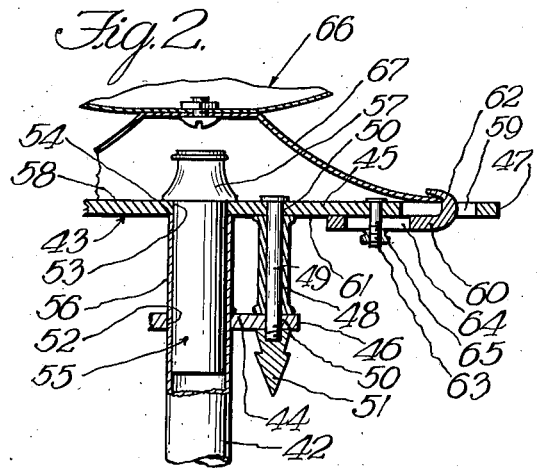
Fig. 2 is an enlarged section taken on the line 2—2 of Fig. 1.
Figure 3:
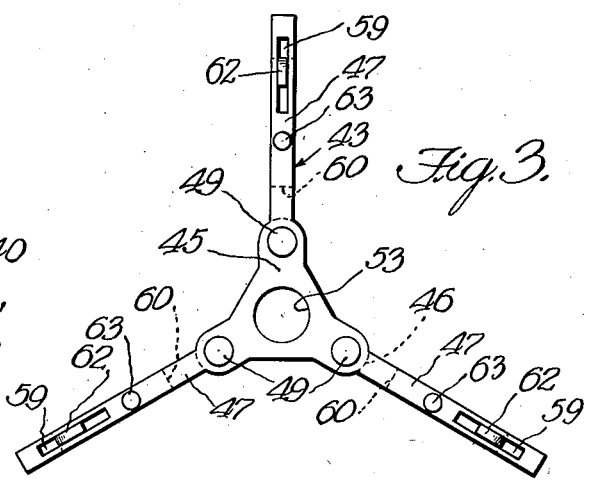
Fig. 3 is a top plan of the upper frame.
Figure 4:
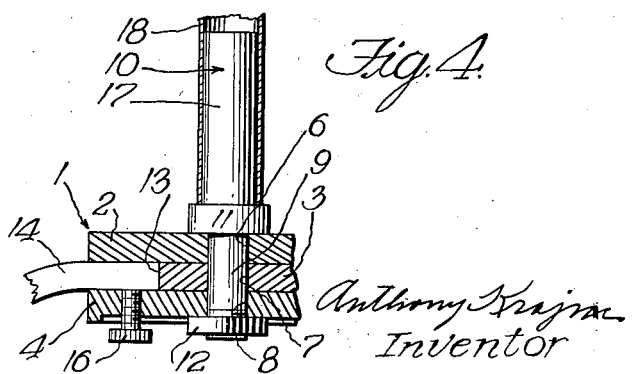
Fig. 4 is an enlarged section taken on the line 4—4 of Fig. 1.

Referring to the drawings, the numeral 1 indicates a base comprising superimposed plates 2, 3 and 4 having aligned central openings 6, 7 and 8 respectively in which is mounted the lower end 9 of a stud 10. The stud 10 is provided with an intermediate protuberance 11 which is drawn tightly in abutment with the plate 2 by a nut 12 threaded on the lower end 9.

The plate 3 is provided with slots 13 in which are arranged the upper inwardly bent ends 14 of supporting legs 15 which are fixed in position by set screws 16 threaded in the plate 4.

Mounted on the upper end 17 of the stud 10 is a supporting tube 18. A frame 19 is mounted on the upper end of the tube 18. Arms 20 and 21 of the frame 19 are arranged in spaced relation by means of sleeves 22. Bolts 23 are mounted in the sleeves 22 and are provided with threaded ends 24 extended through aligned openings 25 and 26 of the arms 20 and 21 respectively. Nuts 27 are threaded on the ends 24 whereby to clamp the arms 20 and 21 together.

The arm 21 is provided with an opening 28 intermediate the openings 26 which is slightly larger than the outside diameter of the tube 18. The arm 20 is provided with an opening 29 aligned with the opening 28 substantially equivalent to the inside diameter of the tube 18 and is adapted to rest upon the top 30 of the tube 18. The lower end 31 of a stud 32 is frictionally arranged in the upper end 33 of the tube 18. The stud 32 is provided with a central protuberance 34 adapted to abut the upper face 35 of the arm 20. With this arrangement the frame may be freely rotated on the tube 18.

The arms 20 and 21 are provided with openings 36 and 37 respectively in which bolts 38 are arranged to clamp an ash tray 39 and humidor 40.

Frictionally mounted on the upper end 41 of the stud 32 is a tube 42. A frame 43 comprises a pair of spaced plates 44 and 45 provided with radially spaced arms 46 and 47 respectively between which are arranged spacing sleeves 48. Bolts 49 are mounted through aligned openings 50 in the arms 46 and 47 and are clamped thereto by nuts 51.

The plate 46 is provided with a central opening 52 slightly larger than the outside diameter of the tube 42. The plate 45 is provided with a central opening 53 substantially equivalent to the inside diameter of the tube 42 and is adapted to rest on the top 54 of the tube 42. A stud 55 is frictionally mounted in the upper end 56 of the tube 42 and is provided with a top protrusion 57 adapted to abut the upper face 58 of the plate 45.

The arms 47 are provided with longitudinal slots 59 in close proximity to their outer ends. Clamping dogs 60 are mounted in abutment with the lower face 61 of the arms 47 and are provided with hook shaped ends 62 extended through the slots 59. Bolts 63 are mounted in the arms 47 and extend through longitudinal slots 64 in the dogs 60. Nuts 65 are threaded on the bolts 63 in abutment with the dogs 60, and may be loosened to facilitate sliding adjustment of the hooks 62 in the slots 59.

A bird cage 66 is provided with a flanged base 67 mounted centrally on the plate 47. The dogs 60 may be moved inwardly to engage above the outer periphery of the base 67, tightening of the nuts 65 serving to lock the cage 66 in position. With this arrangement the bird cage 66 and frame 43 may be revolved on the tube 42.

In Fig. 7 is shown a modified form of the invention wherein the protuberance 34a is provided with a tapped opening 68 in which is threaded a stud 69 formed on the lower end 70 of a pipe holder 71.

In Fig. 8 is a further modified form wherein the frame 43a is provided with spaced openings 72 in which are mounted the downwardly projecting free ends 73 of a ring 74. Nuts 75 threaded on the ends 73 abut the top face 76a of the plate 76 and are locked thereto by nuts 77. At the top of the ring 74 is attached a hook 78 on which a bird cage may be hung.

From the foregoing it will be seen that I have provided a simple and efficient device which is simple in construction, which may be quickly assembled and dissembled to facilitate packing in a minimum amount of space.

It is to be understood that various changes in the detail of construction may be made without departing from the spirit of the invention, and what I desire to protect by Letters Patent is:

1. A device of the class described, including in combination, a standard, a frame rotatably mounted thereon, a plurality of arms extending radially from said frame, said arms having slots in close proximity to their outer ends, a bird cage having a base mounted on said frame, bolts extending downwardly from said frame adjacent the inner ends of said slots, dogs arranged adjacent the lower face of said frame having slots adapted to receive said bolts, said dogs having hook portions extending through the slots in said frame adapted to be moved into engagement with said base.

2. A device of the class described, including in combination, a standard, a frame comprising an upper and lower plate rotatably mounted on said standard, a plurality of arms extending radially from said upper plate having slots at the outer ends thereof, a bird cage having a base mounted on the upper face of said upper plate adjacent said slots, bolts extending downwardly from said frame adjacent the inner ends of said slots, flat dogs mounted adjacent the lower face of said upper plate having slots adapted to receive said bolts, hook portions formed on said dogs extending through the slots in said upper plate, said dogs being slidable relative to said bolts in the slots of said upper plate whereby to engage or disengage said base.

ANTHONY KRAJNC.